Aug. 25, 1964    G. W. MOSELY    3,145,671
PLANTING APPARATUS

Filed Feb. 26, 1962    2 Sheets-Sheet 1

INVENTOR.
GEORGE W. MOSELY
BY
Baldwin & Martin
ATTORNEYS

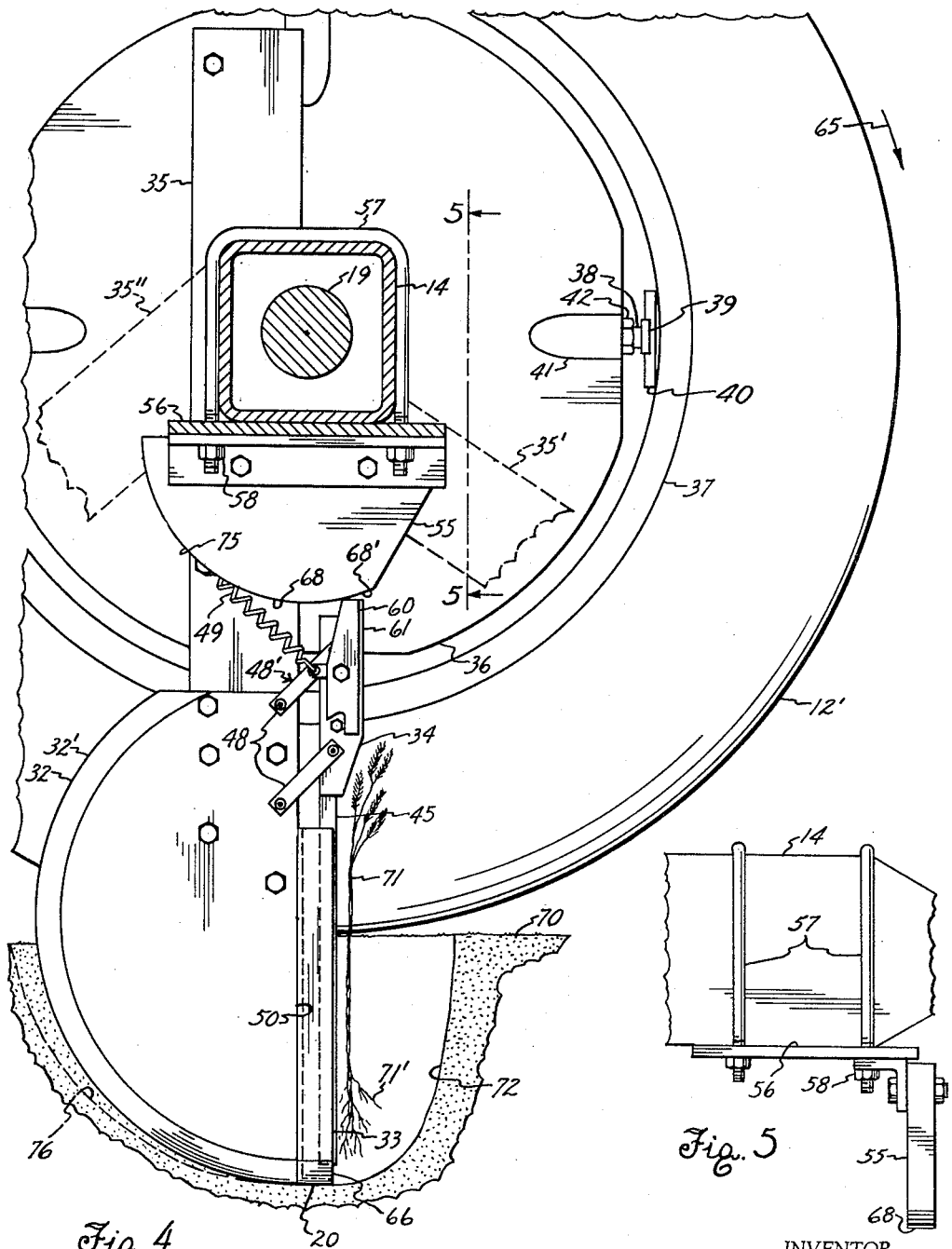

3,145,671
PLANTING APPARATUS
George W. Mosely, P.O. Box 6277, Jacksonville 5, Fla.
Filed Feb. 26, 1962, Ser. No. 175,609
7 Claims. (Cl. 111—3)

This invention relates to planting apparatus and more particularly refers to seedling planting apparatus for attachment to a vehicle.

A general object of the present invention is to provide an improved planting apparatus.

Another general object of this invention is the provision of an improved seedling planting apparatus for attachment to a vehicle.

A specific object of this invention is to provide an improved planting apparatus which is effective and efficient in discharging and setting out seedlings without damaging or mutilating the same.

Particular objects of the invention are to provide an improved planting apparatus which is simple and inexpensive in its construction, and which is rugged and durable in its use.

An additional object of this invention is to provide an improved planting apparatus for attachment to a vehicle so that the apparatus may be readily moved through a field to set out seedlings at predetermined intervals along a row.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIGURE 4 is a side elevational view, similar to FIGURE 2, showing the planting apparatus discharging the seedling into the penetrated ground opening; and FIGURE 5 is a fragmentary view showing vehicle attachment details of a portion of the planting apparatus.

Figure 2:
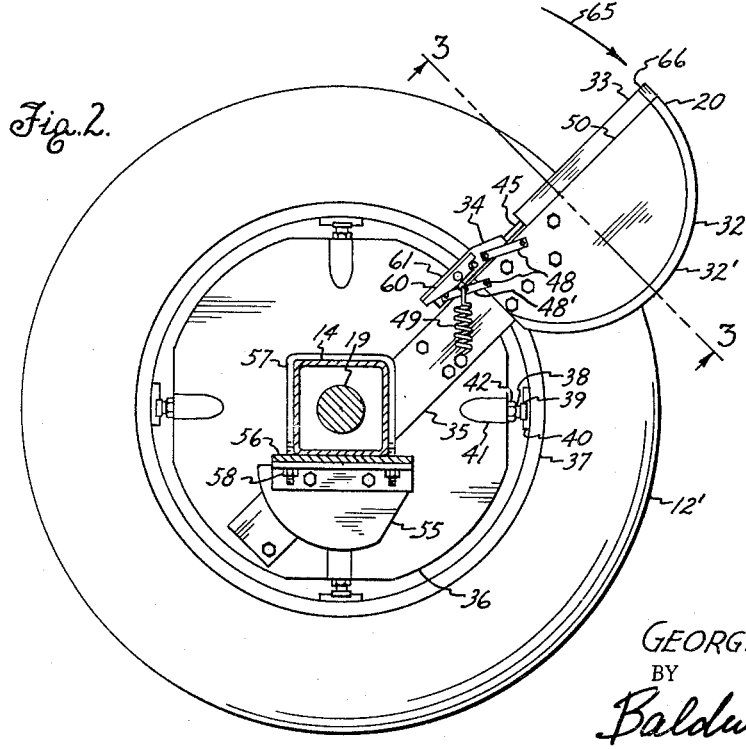
FIGURE 2 is a sectional view taken along line 2—2 of FIGURE 1 showing details of the planting apparatus.
Figure 3:
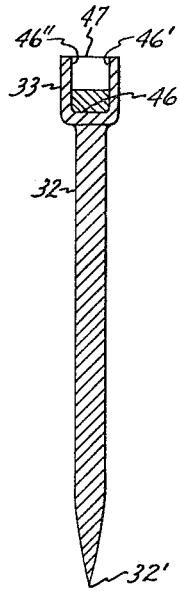
FIGURE 3 is a sectional view taken along line 3—3 of FIGURE 2.

Referring now more particularly to the drawings, a tractor vehicle is generally indicated at 10 having front steering wheels 11 and rear power wheels 12, 12' respectively and rotatably mounted to the frame 10' of vehicle 10 on the ends of horizontal axles, the rear axle 19 being shown in cross-section in FIGURES 2 and 4. Front and rear axle housings 13 and 14 respectively surround the axles, including axle 19, axle housings 13 and 14 being rigidly connected to frame 10'. The tractor vehicle 10 further includes the conventional driver's seat 15, steering wheel 16, and gear shift 18. A box 17 in conveniently positioned rearwardly of seat 15 on frame 10; box 17 having a great number of seedlings (not shown) disposed therein for planting in a field.

The planting apparatus in accordance with this invention is generally depicted at 20, and a duplicate planting apparatus is shown at 21, apparatus 20 being mounted on one side of the vehicle, as will hereinafter be more specifically described in connection with FIGURES 2, 4 and 5. When vehicle 10 is driven through a field the planting apparatus 20 penetrates the ground a predetermined depth and forcibly discharges a seedling within the penetrated ground opening, such ground opening thereafter being closed by the angularly disposed weighted wheels 25 drawn by the vehicle. Weighted wheels 25 are connected aft of the vehicle 10 by draft attachments 26. Auxiliary seats 30 are shown in broken lines in FIGURE 1 which are to be understood as being removably mounted to vehicle 10 in any suitable manner. The use of the auxiliary seats 30 allows attendants to sit thereon while supplying seedlings to the planting apparatus 20 and 21 while the driver of vehicle 10 drives the vehicle through the field.

The components of the planting apparatus 20 are more clearly shown by reference to FIGURES 2, 3, 4 and 5. Planting apparatus 20 comprises a ground penetrating shoe 32, retaining means in the form of a channel 33 affixed to shoe 32 for maintaining a seedling on the shoe, and ejecting means 34 coupled to said shoe for forcibly discharging the seedling from the retaining means 33.

Support means for rotatable mounting shoe 32 includes post 35 fixed to plate 36, and plate 36 is concentrically supported within rim 37 of a rotating member 12', rotating member 12' being herein shown as one of the rear wheels 12 of the vehicle 10. Plate 36 is removably mounted within the rim 37 by extensible members 38 and channel bearing elements 39 which are contiguous with rim protrusions 40, extensible members 38 being respectively threaded within shoulder 41 of plate 36. Lock nuts 42 are provided around respective extensible members 38 for adjustably securing the extensible members in preselected positions within respective shoulders 41 of plate 36.

The ejecting means 34, in accordance with the invention, comprises a rod 45 normally disposed within channel 33 adjacent the bottom surface 46 thereof. Rod 45 is mounted on post 35 by linkages 48; linkages 48, rod 45 and post 35 comprising a four-bar linkage, generally indicated at 48'. The linkages 48 are herein shown as being parallel and of equal length whereby rod 45 is moveable downwardly and away from the bottom surface 46 of channel 33 in a substantially parallel relation upon actuation thereof. A return spring 49 mounted between rod 45 and post 35 normally maintains rod 45 adjacent the bottom surface 46 within channel 33.

It will be seen by referring to FIGURE 2, that the shoe 32 is adapted to receive the seedling into the elongated channel 33, the seedling lying on the rod 45 which is normally disposed by return spring 49 within channel 33 adjacent bottom surface 46. The narrow and flat penetrating shoe 32 is arcuate, preferably being semi-circular, and is mounted for rotation on wheel 12' in a manner such that the lagging straight edge 50 extends approximately along a radius of wheel 12'. The flat shoe 32 simultaneously rotates with wheel 12' in a substantially vertical plane which is spaced from and generally parallel with the vertical plane of wheel 12'. The semi-circular leading edge 32' of shoe 32 is sharpened to permit ease of penetration without substantially disturbing the ground. Channel member 33 is affixed along straight edge 50 of shoe 32 and an end closure 47 is provided on shoe 32 at its ground penetrating end 66 to block the channel lower end 46' thereby preventing a seated or nested seedling within channel 33 from inadvertent displacement.

A vertically extending cam element 55 is fixedly mounted to and below vehicle 10 by bracket 56, bracket 56 being secured to rear axle housing 14 by U-shaped clamps 57 and nuts 58 threaded thereon, specifically shown in FIGURE 5. A cam follower or bearing element 60 is attached to the upper end 61 of rod 45, element 60 extending laterally of rod 45 and from wheel 12' toward the axle housing 14 and cam element 55. Follower 60 and vertically extending cam element 55 are cooperatively disposed in a planar working relation whereby follower 60 intermittently bears on the cam surface 68 during rotation of wheel 12' to forcibly move rod 45 on linkages 48 to eject the seedling 71 from the discharge outlet 46″ of channel 33.

The operation of the planting apparatus 20 will be more clearly understood by referring to FIGURE 2, specifically in connection with FIGURE 4. As the vehicle 10 is being driven through a field, wheels 12 rotate in the clockwise direction of arrow 65 and shoe 32 simultaneously rotates therewith. When the planting apparatus 20 is in the position above the ground shown in FIGURE 2, an attendant removes a seedling from box 17 and disposes the seedling into the upwardly facing channel 33, the roots 71′ of the seedling 71 being disposed adjacent the ground penetrating end 66 of shoe 32. As seen, the rod 45 is positioned in its normal withdrawn position within channel 33 and the seedling 71 lies thereon within channel 33. Upon continuing the rotation of wheel 12, shoe 32 begins penetrating the ground, generally indicated by 70 in FIGURE 4, and when the shoes reaches a position in which the channel 33 is substantially vertical, the rod 45 is automatically actuated to move downwardly and outwardly by cam 55 into the position shown in FIGURE 4, thereby forcibly discharging the seedling 71 outwardly from channel 33 through its discharge outlet 46″ into the penetrated ground opening 72. While the shoe 32 is penetrating the ground, the bearing element or follower 60 on rod 45 is out of engagement with the cam surface 68 of cam 55 until the channel 33 and seedling 71 are positioned generally in a vertical position for discharge by cam 55 and rod 45. The bearing element 60 of rod 45 engages the portion generally at 68′ of cam surface 68 for actuation of rod 45 downwardly and outwardly from the channel bottom surface 46 in a substantially parallel relation and substantially in a counterclockwise direction opposite to arrow 65 to forcibly eject seedling 71 into ground opening 72. The rod 45, which moved outwardly of channel 33, returns within channel 33, under the influence of spring 49, as the shoe 32 reaches an approximate location at 75 on cam surface 68. The planting apparatus 20 then returns to the position shown in FIGURE 2 upon further rotation of wheel 12, apparatus 20 being ready to receive another seedling within its channel 33 for repetitive planting of additional seedlings as the vehicle 10 moves through the field.

The ground opening penetrated by shoe 32 during rotation thereof from its position in FIGURE 2 to its position in FIGURE 4 is indicated by 72. The broken lines 76 below the ground 70 depicts the remainder of the ground opening upon further rotation in the direction of arrow 65 until the shoe 32 clears the ground level indicated. A plot of the apparatus 20 during its rotative travel would indicate that shoe 32 commenced penetrating the ground about 60 degrees prior to the vertical position shown in FIGURE 4, the location of the shoe supporting post 35 being indicated by broken line 35′. The location of post 35 is shown in FIGURE 4 by broken lines 35″ when shoe 32 clears the ground level, the location being about 50 degrees in the clockwise direction of arrow 65 from the vertical position of shoe 32 shown in FIGURE 4. Accordingly, the specific shoe 32 of the herein described planting apparatus 20 is partially below the ground 70 for about 110 degrees during the 360 degree rotation thereof with the wheel 12′.

While shoe 32 and support post 35 are shown removably mounted to wheel 12′ by plate 36 and extensible members 38, it is to be understood that the shoe 32 and the post 35 could be mounted to wheel 12′ by a selective clutch mechanism (not shown) whereby the shoe 32 would be selectably rotatable with wheel 12′.

Figure 1:
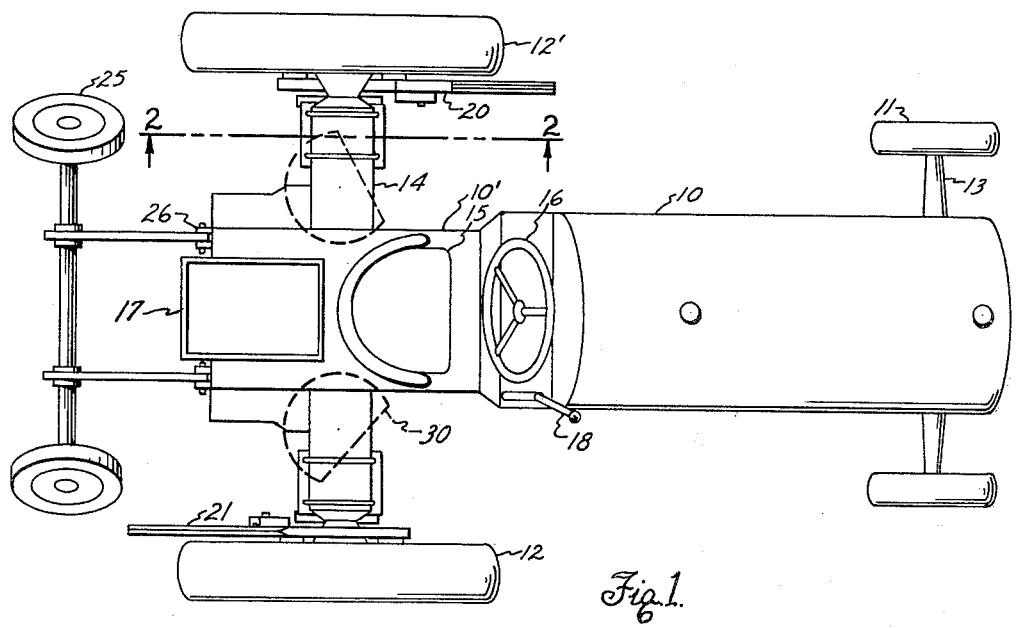
FIGURE 1 is a top plan view of a tractor vehicle supporting a pair of planting apparatus in accordance with the invention, auxiliary seats for the vehicle being shown in broken lines.

It is further to be noted that the planting apparatus 20 and 21 are shown as being 180 degrees out of phase in FIGURE 1. The vehicle 10, due to the fact that the rear wheels 12 are differentially driven and the inside wheel during a turn travels less than the outside wheel, will not maintain this phase difference between the planting apparatus 20 and 21. Therefore, less uniform or haphazard planting of the seedlings between adjacent rows is accomplished by the planting apparatus 20 and 21 on vehicle 10, such haphazard planting being preferred for the planting of pine seedlings, for example.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. Apparatus for planting a seedling comprising a rotating ground engaging wheel, a narrow and flat ground penetrating shoe having a sharpened leading edge for opening a seedling receiving furrow in the ground without substantially disturbing the ground, mounting means connecting said shoe to said wheel for rotation therewith, channel means connected to said shoe for carrying the seedling on said shoe during rotation thereof, said shoe being adapted and arranged to rotate from a position above the ground to a penetrated position below the ground, said penetrated position of said shoe being within the ground a predetermined depth to dispose the seedling carried by said shoe with its roots below the ground level, and ejecting means including a cam and a cam follower, means supporting said cam follower on said shoe for simultaneous rotation therewith, said cam being connected to said apparatus and fixed relative to said cam follower, said cam actuating said cam follower upon rotation of said cam follower and of said shoe to its said penetrated position within the ground, said cam follower upon actuation by said cam being operable to engage and to forcibly discharge the seedling in a direction substantially opposite to the direction of rotation of said wheel and shoe from said carrying means.

2. A seedling planting apparatus for attachment to a vehicle having a frame and rotating ground engaging wheels comprising a ground penetrating shoe mounted for rotation with one of said wheels, said shoe having a leading edge for ground penetration and a lagging edge, an outwardly facing elongated channel for receiving therein a seedling to be planted, said channel being attached to said lagging edge of said shoe and having a discharge outlet spaced from said lagging edge, said shoe being adapted and arranged to rotate from a position above the ground to a penetrated position below the ground upon rotation of said one wheel, a cam affixed to said frame adjacent said one wheel, a cam follower supported on said shoe for simultaneous rotation therewith, a rod attached to said cam follower and being disposed within said channel, said cam actuating said cam follower upon rotation of said cam follower and said shoe to its said penetrated position within the ground, said cam follower upon actuation by said cam moving said rod to engage the seedling within said channel and to forcibly discharge the seedling from said channel outwardly through said discharge outlet thereby disposing the seedling with its top above and its roots below the ground level.

3. A seedling planting apparatus for attachment to a vehicle wherein the vehicle includes a frame and wheels rotatably mounted on horizontal axles comprising an arcuate shoe having a leading arcuate ground penetrating edge and a lagging straight edge, mounting means connecting said shoe for rotation with one of said wheels and disposing said straight edge of said shoe substantially radially of said one wheel, an elongated seedling receiving channel having a bottom surface, said channel being affixed to said straight edge adjacent said bottom surface of said channel having an elongated discharge outlet spaced from said bottom surface, an elongated rod having one end extending into said channel and normally located adjacent said bottom surface of said channel, means attached to the other end of said rod for movably mounting said rod to said shoe, a cam bearing element attached to said other end of said rod, a cam attached to said frame and disposed below the horizontal axle which mounts said one wheel, said shoe being adapted to rotate from a position above the ground to a penetrated position below the ground, said cam actuating said cam bearing element to move said rod from its normal position adjacent said bottom surface of said channel against the seedling to forcibly discharge the seedling outwardly from said channel through said discharge outlet when said shoe is rotated to its said penetrated position whereby the roots of the seedling are disposed below and the top is disposed above the ground level.

4. A seedling planting apparatus for attachment to a vehicle having a horizontal frame and vertical rotating ground engaging wheels comprising a ground penetrating shoe, means mounting said shoe to one of said wheels for rotation therewith, said shoe rotating in one direction in a plane which is spaced from and substantially parallel to the plane of rotation of said one of said vertical wheels, said shoe having a leading arcuate edge for ground penetration and a lagging edge, an outwardly facing elongated channel for receiving therein a seedling to be planted, said channel being attached to said lagging edge of said shoe and having an elongated discharge outlet spaced from said lagging edge, said shoe being adapted and arranged to rotate from a position above the ground to a penetrated position below the ground upon rotation of said one wheel, a cam affixed to said frame adjacent said one wheel, a cam follower supported by said shoe adjacent said one wheel in a planar working relation with said cam, a rod attached to said cam follower and being disposed within said channel, said cam actuating said cam follower upon rotation of said one wheel together with said shoe and cam follower to said penetrated position of said shoe within the ground, said cam follower upon actuation by said cam moving said rod to engage the seedling within said channel and to forcibly discharge the seedling from said channel outwardly through discharge outlet thereby disposing the seedling with its roots below and the top is disposed above the ground level.

5. A seedling planting apparatus for attachment to a vehicle wherein the vehicle includes a horizontal frame and vertical wheels rotatably mounted on horizontal axles comprising a flat arcuate shoe having a leading arcuate ground penetrating edge and a lagging straight edge, mounting means supporting said flat shoe vertically adjacent one of said wheels for rotation therewith in one direction, said straight edge of said shoe being disposed substantially radially of said one wheel, an elongated outwardly facing and seedling receiving channel affixed to said straight edge and having a bottom surface adjacent thereto, said channel having an elongated discharge outlet spaced from said bottom surface, an elongated rod having one end extending into said channel, spring means attached between said rod and said channel for maintaining said rod adjacent said bottom surface of said channel, means attached to the other end of said rod for movably mounting said rod to said shoe, a cam bearing element attached to said other end of said rod, a cam attached to said frame adjacent said one wheel and disposed below the horizontal axle which mounts said one wheel, said shoe being adapted to rotate from a position above the ground to a penetrated position below the ground upon rotation of said one wheel, said cam actuating said cam element to move said rod from its position adjacent said bottom surface of said channel toward said discharge outlet against the seedling to forcibly discharge the seedling outwardly from said channel through said discharge outlet when said shoe is rotated to its said penetrated position whereby the roots of the seedling are disposed below and the top is disposed above the ground level.

6. A seedling planting apparatus for attachment to a vehicle having a horizontal frame and vertical rotating ground engaging wheels comprising a planar ground penetrating shoe, means supporting said planar shoe to one of said vertical wheels for rotation therewith, the plane of rotation of said shoe being spaced from and substantially parallel to the plane of rotation of said one wheel, said shoe having a leading arcuate edge for ground penetration and a lagging edge, an outwardly facing elongated channel for receiving therein a seedling to be planted, mounting means connecting said channel to said lagging edge of said shoe, said shoe being adapted and arranged to rotate in one direction from a position above the ground to a penetrated position below the ground upon rotation of said one wheel, a cam affixed to said frame adjacent said one wheel, a cam follower, a linkage movably mounting said cam follower to said one wheel for rotation therewith, said linkage positioning said cam follower in a planar working relation with said cam, an elongated rod attached at one of its ends to said cam follower and the other of its ends extending into said channel, spring means attached to said rod for maintaining said rod adjacent the bottom surface of said channel, said cam actuating said cam follower upon rotation of said one wheel together with said shoe and cam follower to said penetrated position of said shoe within the ground, said cam follower upon actuation by said cam moving said rod on said linkage engagingly and forcibly against the seedling within said channel to discharge the seedling from said channel in another direction substantially opposite to said one direction thereby disposing the seedling with its top above and its roots below the ground level.

7. A seedling planting apparatus for attachment to a vehicle having a horizontal frame and vertical rotating ground engaging wheels comprising a ground penetrating shoe, support means for connecting said shoe to one of said vertical wheels for rotation therewith, said shoe having a leading edge for ground penetration and a lagging edge, a seedling receiving channel having a bottom surface, said channel connected to said lagging edge of said shoe adjacent said bottom surface of said channel, said channel having an outwardly facing opening spaced from said bottom surface for receiving and discharging a seedling therethrough, a cam affixed to said frame adjacent said one wheel, an elongated rod having one end disposed within said channel and the other end extending outwardly therefrom, a cam follower attached to said other end of said rod, a pair of linkage arms movably mounting said cam follower and rod to said shoe, said cam follower and rod being rotatable with said shoe, spring means coupled to said rod for maintaining said one end of said rod adjacent said bottom surface of said channel, said cam actuating said cam follower upon rotation of said one wheel together with said shoe and cam follower to a predetermined position wherein the roots of the seedling carried by said shoe in said channel will be positioned beneath and the top thereof will be positioned above the ground level, said cam follower upon actuation by said cam moving said rod on said linkage from its position adjacent said bottom surface of said channel into engagement with and forcibly against the seedling within said channel to discharge the seedling through said opening of said channel into the ground.

References Cited in the file of this patent

UNITED STATES PATENTS

| | | |
|---|---|---|
| 16,551 | Perkins | Feb. 3, 1857 |
| 490,942 | Bender | Jan. 31, 1893 |
| 602,894 | Cheeseman | Apr. 26, 1898 |
| 1,396,784 | Samuels | Nov. 15, 1921 |
| 2,530,260 | Miller | Nov. 14, 1950 |
| 2,543,888 | Bunch | Mar. 6, 1951 |
| 3,014,441 | Berg | Dec. 26, 1961 |

FOREIGN PATENTS

| | | |
|---|---|---|
| 279,328 | Germany | Oct. 17, 1914 |
| 309,655 | Germany | Dec. 5, 1918 |
| 254,813 | Italy | Sept. 17, 1927 |